(12) United States Patent
Finkelstein

(10) Patent No.: US 9,803,403 B2
(45) Date of Patent: Oct. 31, 2017

(54) PANEL FASTENER

(71) Applicant: Kason Industries, Inc., Newnan, GA (US)

(72) Inventor: Burl M Finkelstein, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 40 days.

(21) Appl. No.: 14/162,988

(22) Filed: Jan. 24, 2014

(65) Prior Publication Data

US 2015/0211267 A1    Jul. 30, 2015

(51) Int. Cl.
| | |
|---|---|
| *E05C 19/10* | (2006.01) |
| *E05C 3/14* | (2006.01) |
| *E05B 65/08* | (2006.01) |
| *E04B 1/61* | (2006.01) |
| *F25D 23/06* | (2006.01) |
| *F16B 5/00* | (2006.01) |
| *E05C 3/04* | (2006.01) |
| *E05B 65/00* | (2006.01) |

(52) U.S. Cl.
CPC .............. *E05C 3/14* (2013.01); *E04B 1/6183* (2013.01); *E05B 65/0817* (2013.01); *F16B 5/0004* (2013.01); *F25D 23/063* (2013.01); *E05B 65/006* (2013.01); *Y10T 29/49863* (2015.01); *Y10T 292/0957* (2015.04)

(58) Field of Classification Search
CPC ... E05C 3/14; E05C 3/004; E05C 3/12; E05C 3/124; E05C 3/145; E05C 3/40; E05C 3/165; E05C 3/16; E05C 3/22; E05C 3/30; E05C 5/00; E05C 5/02; E05B 65/006; E05B 65/0817; E04B 1/6183; F16B 5/0004; F16B 5/0036; F25D 23/063
USPC ... 292/240–242, 95, 98, 101, 194, 200, 111, 292/109, 124, 129, 224, 229, 234, 197; 52/127.7, 127.9, 127.11; 403/231, 245, 403/DIG. 8
See application file for complete search history.

(56) References Cited

U.S. PATENT DOCUMENTS

| | | | | |
|---|---|---|---|---|
| 2,647,287 | A | * | 8/1953 | Jones ........................... 52/582.2 |
| 3,191,244 | A | * | 6/1965 | Burke .......................... 52/127.9 |
| 3,472,545 | A | | 4/1967 | Berkowitz |
| 3,341,233 | A | * | 9/1967 | Cushman ....................... 403/93 |
| 3,565,469 | A | * | 2/1971 | Zwart .......................... 52/582.2 |
| 3,661,410 | A | | 5/1972 | Larson et al. |
| 3,671,006 | A | | 6/1972 | Berkowitz |
| 3,784,240 | A | * | 1/1974 | Berkowitz .................... 292/111 |
| 4,020,613 | A | | 5/1977 | Reynolds et al. |
| 4,507,010 | A | | 3/1985 | Fujiya |

(Continued)

*Primary Examiner* — Alyson M Merlino
(74) *Attorney, Agent, or Firm* — Baker, Donelson, Bearman, Caldwell & Berkowitz, PC; Dorian Kennedy

(57) ABSTRACT

A panel fasteners (20) is disclosed in the form of a hook and cam assembly (21) having two side walls (24) with a boss (27) through which a cam shaft (28) is journalled. The cam shaft has a socket (29) and a round cam (30). A hook (32) is frictionally mounted in camming engagement with the cam. A leaf clutch spring (33) is mounted within a spring mounting notch (36) and in frictional engagement with a substantially round cam engagement hole (34) of the hook. To position the spring into the spring mounting notch and cam engagement hole the spring is pre-compressed prior to mounting it within the spring mounting notch by forcing it through a narrowing channel positioned adjacent the cam.

4 Claims, 2 Drawing Sheets

(56) References Cited

U.S. PATENT DOCUMENTS

| | | | |
|---|---|---|---|
| 4,512,122 A | | 4/1985 | Berkowitz |
| 4,655,013 A | * | 4/1987 | Ritland .......................... 52/81.4 |
| 4,693,630 A | | 9/1987 | Giovannetti |
| 4,930,931 A | | 6/1990 | Matsui |
| 5,212,924 A | | 5/1993 | Finkelstein |
| 5,452,925 A | * | 9/1995 | Huang ............................ 292/57 |
| 6,070,919 A | | 6/2000 | Finkelstein |
| 6,079,754 A | | 6/2000 | Alexy |
| 6,299,224 B1 | | 10/2001 | Finkelstein |
| 6,386,788 B1 | | 5/2002 | Finkelstein et al. |
| 6,409,235 B1 | | 6/2002 | Finkelstein |
| 6,530,610 B2 | | 3/2003 | Finkelstein |
| 6,550,125 B1 | | 4/2003 | Finkelstein et al. |
| 6,681,471 B1 | | 1/2004 | Finkelstein |

\* cited by examiner

PANEL FASTENER

TECHNICAL FIELD

This invention relates generally to panel fasteners, and more particularly to panel fastener cam and hook assemblies that are used to fasten large insulated panels together in constructing the walls, floors and ceilings of refrigerated spaces, and to a method of manufacturing panel fastener cam and hook assemblies.

BACKGROUND OF THE INVENTION

Commercial walk-in coolers, such as those commonly found in convenience stores and commercial food storage facilities such as supermarkets, are typically constructed of insulating wall, ceiling and floor panels that are fastened together. The panel ends are shaped to fit together in tongue and groove fashion and are provided with latch type fastening means for drawing and holding adjacent panels together. The latches themselves commonly comprise a hook and cam assembly inside a casing that is mounted to one panel for latching engagement with a pin assembly inside a casing that is mounted to an adjacent panel.

The hook and cam assembly includes a C-shaped leaf spring that operates in a clutch like action by transferring torque from the cam to the hook. The advantage of using a C-shaped cam spring is that it provides sufficiently high frictional resistance for driving the hook. To position the spring into the cam the hook is provided with a cam hole that is ob-round, meaning that it is not completely round but instead has a portion that is round and a spring recess extending from the round portion that creates a space, as shown in FIG. 4. During assembly, the cam is oriented so that the relaxed spring is coupled to the cam by inserting it into the spring recess.

During actuation of the latch, the cam turns bringing the spring into engagement with the hook and thereby compressing the spring. This causes the spring to shift in a direction opposite to the direction in which the hook is driven.

A problem which may occur with the ob-round hole design is that the cam can be rotated under certain circumstances to release the hook, which renders the fastener unable to be reset. If this occurs, manual intervention or replacement becomes necessary to correct the situation. The spring may also become dislodged if it is moved back to a position within the spring recess, due to the spring becoming de-compressed.

It thus is seen that a need has long existed for a panel fastener with a cam and hook assembly of the type that employs a C-shaped spring that is easier to manufacture and is not susceptible to the spring being disengaged. It is to the provision of such that the present invention is primarily directed.

SUMMARY OF THE INVENTION

In a preferred form of the invention a panel fastener for insulated panels comprises a pair of sidewalls each having a boss therethrough, a cam rotatably positioned within the boss of each sidewall and having a spring mounting notch, a spring mounted within the spring mounting notch of the cam, and a hook extending from the pair of sidewalls and having a generally round cam engagement hole therethrough. The cam is positioned within the round cam engagement hole with the spring extending outwardly to contact the round cam engagement hole. With this construction, contact between the spring and the hook round cam engagement hole causes frictional contact sufficient to rotate the hook through rotation of said cam.

In another preferred form of the invention a method of manufacturing a panel fastener for insulated panels comprising the steps of (A) providing a housing having a boss therethrough, a hook having a substantially round cam engagement hole therethrough, a cam having spring mounting notch, and a compressible spring, (B) positioning the hook within the housing with the round cam engagement hole of the hook axially aligned with the boss of the housing, and positioning the cam within the round cam engagement hole of the hook and the boss of the housing, (C) compressing the spring, and (D) positioning the compressed spring while in its compressed condition into the spring mounting notch of the cam and in frictional contact with the round cam engagement hole of the hook.

DETAILED DESCRIPTION

Figure 1:
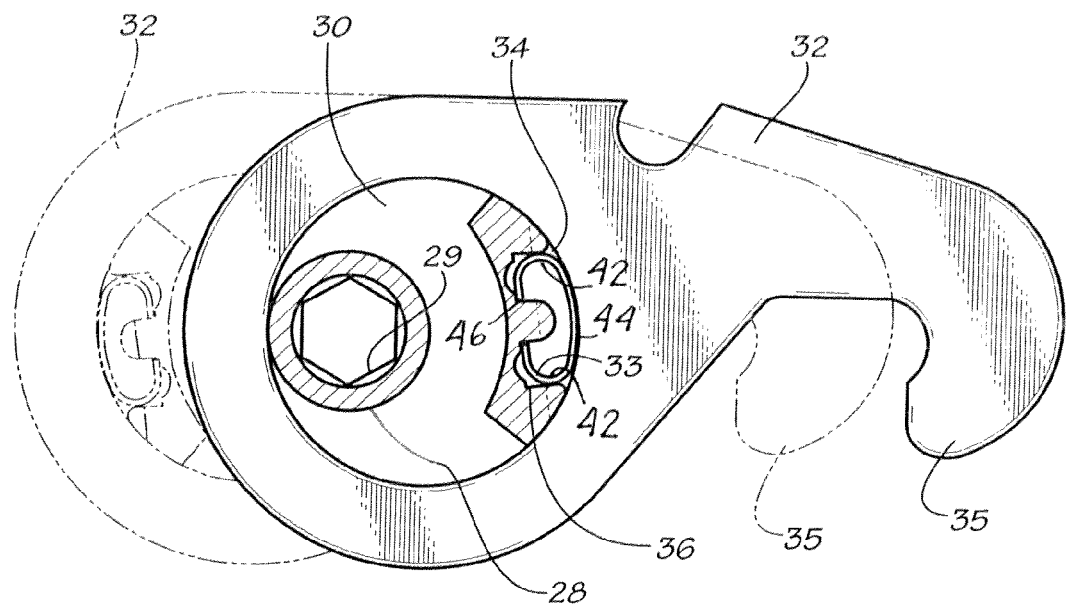
FIG. 1 is a side view, partially in cross-section, of a hook and cam assembly that embodies principles of the present invention.
Figure 3:
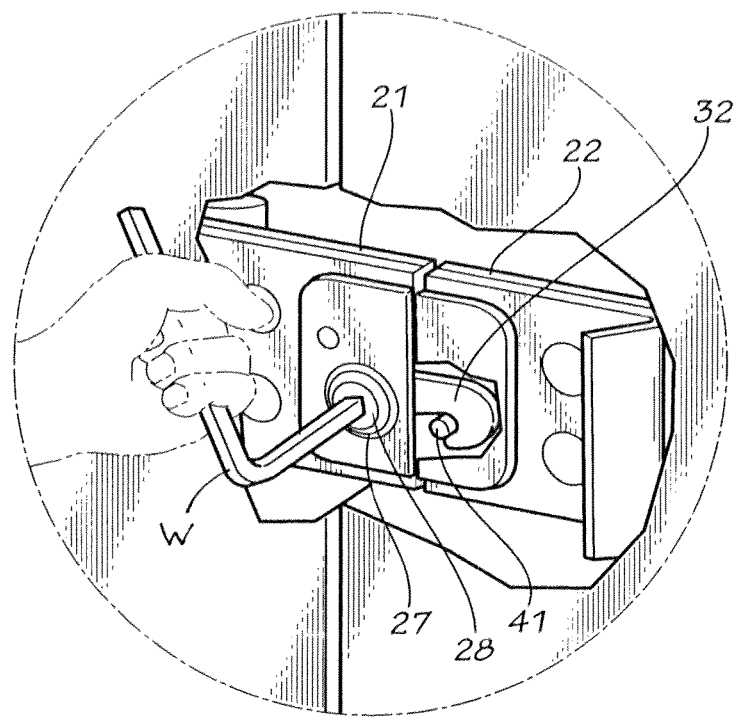
FIG. 3 is a perspective view, partially in cross-section, of a panel fastener having the hook and cam assembly of FIG. 1 and a panel fastener having a pin assembly.

With reference next to the drawings, there is shown a pair of conventional wing type panel fasteners 20. The fasteners are in the form of a hook and cam assembly 21 and a pin assembly 22. The hook and cam assembly 21 has a metallic housing or casing comprised of two side walls 24 joined together. Each side wall has a flange 25, hence a wing. Each side wall is formed with a boss or boss hole 27 through which a cam shaft 28 is journalled. It should be understood that the term boss as used herein is intended to denote a typical boss structure as well as simply a mounting hole or the like. The cam shaft is formed with a socket 29 in which a hand wrench W may be inserted as shown in FIG. 3. The cam shaft protrudes from each side of a round, disc-shaped cam 30, as shown in U.S. Pat. No. 6,299,224 which is specifically incorporated herein by reference. A hook 32 having a catch end 35 which extends out of the casing is mounted in camming engagement with the cam 30. As best shown in FIG. 1, a C-shaped leaf clutch spring 33 is mounted within a spring mounting notch 36 and in frictional engagement with a substantially round cam engagement hole or circular inner wall 34 of the hook 32, as described in more detail hereinafter. The C-shaped leaf clutch spring 33 has two loop portions 42, a bridge portion 44 that bridges the two loop portions 42, and two opposing end portions 46

The pin assembly 22 is of similar construction. It too has a winged metallic casing 40 to which a pin 41 is mounted that bridges two side walls of the casing. The pin assembly 22 is foamed in place in a panel in catching alignment with the hook 32 of a hook and cam assembly 21 that has been foamed in place in an adjacent panel.

Figure 2:
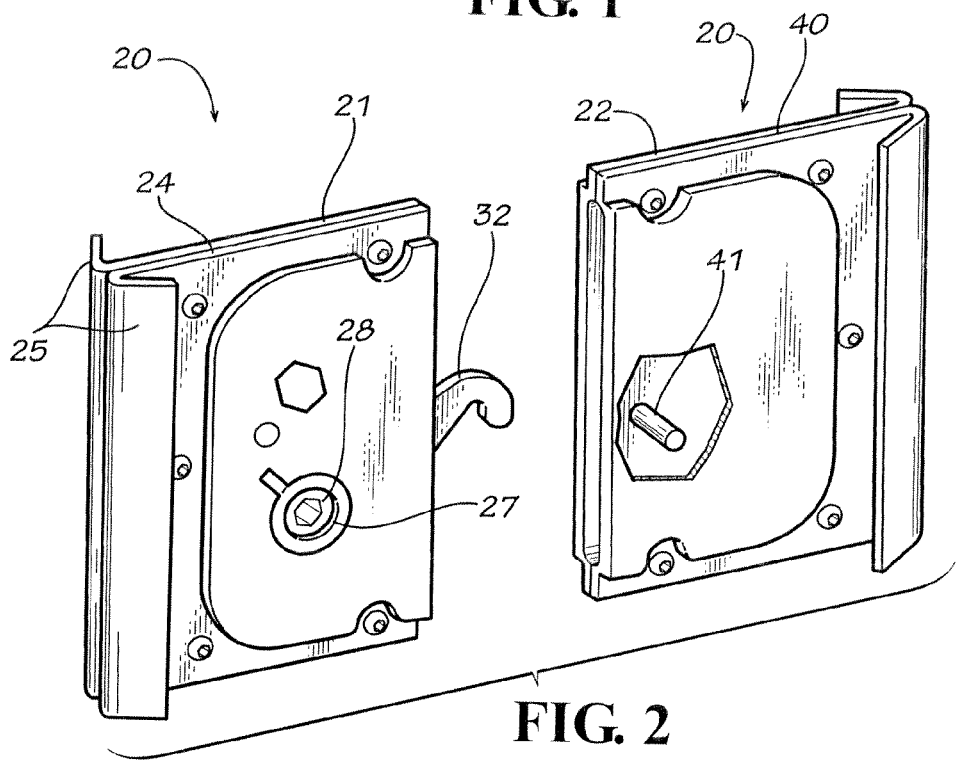
FIG. 2 is perspective view of a panel fastener having the hook and cam assembly of FIG. 1 and a panel fastener having a pin assembly.

As best shown in FIGS. 2 and 3, the cam 18 can be turned with a socket wrench W to engage the shank of the hook 12 with a pin in an adjacent panel. Further rotation of the cam 18 drives the hook to the left as shown in broken lines in FIG. 1, bringing its catch end 13 forcefully against the pin in the adjacent panel. The rotation of the cam 18 thus causes the spring 33 to clutch the hook inner wall 16 and to drive the hook 12 causing it to engage with or disengage from the pin, depending on its direction of rotation. The flexing of the spring 33 also keeps the hook restrained after engagement with the pin by imposing friction between the spring 33 and the hook inner wall 16.

Figure 4:
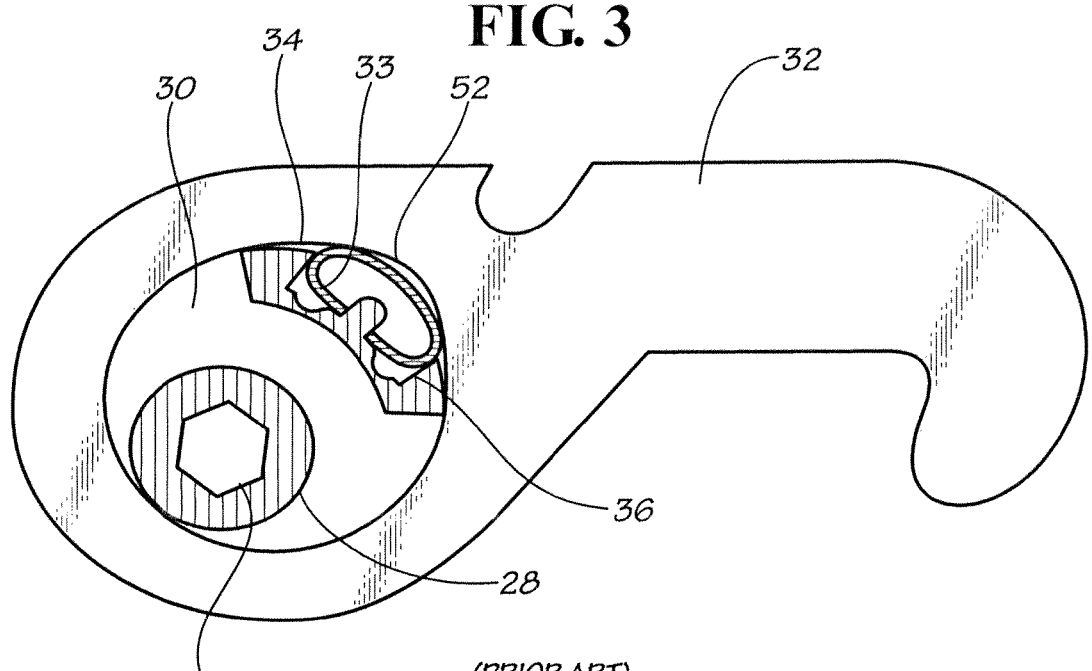
FIG. 4 is a side view, partially in cross-section, of a hook and cam assembly of the prior art.

A common problem heretofore had with prior art fastener hook and cam assemblies can be understood through the illustration of a prior art hook and cam assembly 21 shown in FIG. 4, wherein the like components are labeled with the same reference numbers as previously identified with respect to the new hook of the present invention. In FIG. 4 the prior art hook's cam engagement hole or inner wall 34 is formed with a spring mounting or offset recess 52 in which the spring 33 is initially positioned during assembly, i.e., the cam engagement hole 34 has a recess 52 which makes the hole non-circular or ob-round. The ob-round hole was intended to facilitate the assembly of the cam, hook, and spring, as the recess 52 permits the clutch leaf spring 33 to be coupled to the cam 30 by aligning the spring mounting notch 36 with the recess 52 and then placing or positioning a relaxed or uncompressed leaf spring 33 into the recess 52 wherein the recess 52 allowed for clearance of the relaxed clutch leaf spring extending outwardly from the spring mounting notch 36. Subsequent rotation of the cam with the wrench W causes compression of the spring which aids in holding the components in their proper positions. However, should the cam and hook assembly be moved from a spring compressed position back to a spring uncompressed position (the spring is positioned once again into the recess by either over rotating the cam or reversing the direction of the cam back to its initial position with the notch aligned with the recess) the spring can become dislodged from the spring mounting notch, thereby rendering the hook and cam assembly inoperable. The present invention, which includes a circular or round cam engagement hole 34, prevents this from occurring by always keeping the spring in a compressed condition through the elimination of the ob-round recess 52.

With the round cam engagement hole 34 of the present invention the prior art engagement hole recess 52 no longer exists, however, this causes a new problem associated with initially mounting the spring into its proper position within the cam's spring mounting notch 36. Now, in order to position the spring into the spring mounting notch 36 and cam engagement hole 34 the spring is pre-compressed prior to mounting it within the spring mounting notch 36. To accomplish this task, the spring is positioned within a tapering or narrowing channel or chute having an exit end immediately adjacent the spring mounting notch 36. A ram is then actuated to force the spring down the chute wherein the tapering of the chute causes the spring to be compressed or somewhat flattened. The end of the chute is positioned immediately adjacent the cam so that as the spring exits the chute it is immediately positioned within the spring mounting notch and against the cam engagement hole 34 in a compressed condition, i.e., the spring is not allowed to decompress.

Another problem that occurs with the prior art ob-round hole design is that the leaf spring deforms tangentially as it is compressed, thereby causing a large drop (approximately 50% reduction) in the torque required to rotate the cam after a few actuations of the cam. As such, the panel fastener must be designed with an initially higher torque requirement, however, the higher torque may cause the panels to shift during installation. With the new round hole design the torque is much more stabilized and there is only a small reduction in torque with subsequent use because instead of the spring being compressed tangentially, as with the prior art design, it is compressed radially into the cam. Therefore, the panel fastener may include a smaller amount of torque to initially actuation the cam. The more stable torque helps the panel installers by not exerting so much force on the adjacent panel during initial locking of the panel fasteners together and thereby reducing the chances of the panels shifting during assembly.

It should be understood that other devices or methods may be utilized in the present invention to compress the spring prior to positioning it within the spring mounting notch 36.

It should also be understood that the term "substantially round" or "generally round" cam engagement hole is intended to denote a hole which is round in shape and not ob-round, and is intended to incorporate holes which may not be perfectly round due to the manufacturing process and slight variations due to mechanical tolerances.

It is thus seen that a panel fastener and a method of manufacturing such is now provided that includes a round cam engagement hole rather than an ob-round cam engagement hole to provide a more secure mounting of the leaf clutch spring. Although the invention has been shown and described in its preferred form, it should be understood that modifications and variations may be made thereto without departure from its spirit and scope as set forth in the following claims.

The invention claimed is:

1. A panel fastener for insulated panels comprising:
a pair of sidewalls each having a boss therethrough;
a cam having a cam shaft rotatably positioned within said boss of each said sidewall, said cam having a spring mounting notch extending inwardly from a peripheral edge of said cam;
a leaf spring mounted within said spring mounting notch of said cam, and
a hook extending from said pair of sidewalls and having a generally round cam engagement hole therethrough defined by a substantially round cam engagement hole sidewall and a catch extending past said pair of sidewalls, said generally round cam engagement hole not including a spring offset recess, said cam being positioned within said generally round cam engagement hole with said leaf spring extending outwardly to frictionally engage said substantially round cam engagement hole sidewall,
whereby contact between the leaf spring and the substantially round cam engagement hole sidewall of the hook causes frictional contact sufficient to rotate the hook through rotation of said cam.

2. A panel fastener for insulated panels comprising:
a housing having at least boss hole therethrough;
a hook having a catch end, said hook having a substantially round cam engagement hole therethrough defined by a substantially round cam engagement hole sidewall, said substantially round cam engagement hole not including a spring offset recess;
a cam having a cam shaft extending through said at least one boss hole of the housing and rotatably mounted within said substantially round cam engagement hole of the hook, said cam having spring mounting notch extending inwardly from a peripheral edge of said cam and a leaf spring positioned at least partially within said spring mounting notch so as to be biased against said substantially round cam engagement hole sidewall of the hook, whereby frictional contact between the leaf spring and the substantially round cam engagement hole sidewall of the hook causes rotation of said hook with the rotation of said cam.

3. A method of manufacturing a panel fastener for insulated panels comprising the steps of:
  (A) providing a housing having a boss therethrough, a hook having a substantially round cam engagement hole therethrough which is defined by a substantially round cam engagement hole sidewall which does not include a spring offset recess, a cam having spring mounting notch and a cam shaft, and a compressible spring;
  (B) positioning the hook within the housing with the substantially round cam engagement hole of the hook axially aligned with the boss of the housing, and positioning the cam within the substantially round cam engagement hole of the hook and the cam shaft within the boss of the housing;
  (C) compressing the spring, and
  (D) positioning the compressed spring while in its compressed condition into the spring mounting notch of the cam and in frictional contact with the substantially round cam engagement hole sidewall of the hook.

4. The method of claim 3 wherein said compressed spring is a leaf spring.

* * * * *